United States Patent [19]

Bender

[11] Patent Number: 5,451,089
[45] Date of Patent: Sep. 19, 1995

[54] TAILGATE HANDLE ASSEMBLY AND METHOD OF ASSEMBLY THEREOF

[75] Inventor: Frederick F. Bender, South Lyon, Mich.

[73] Assignee: Chrysler Corporation, Highland Park, Mich.

[21] Appl. No.: 124,066

[22] Filed: Sep. 21, 1993

[51] Int. Cl.⁶ .......................................... B62D 25/00
[52] U.S. Cl. .................................. 296/57.1; 296/50; 292/DIG. 29
[58] Field of Search ................... 296/57.1, 106, 50; 292/DIG. 29

[56] References Cited

U.S. PATENT DOCUMENTS

| | | |
|---|---|---|
| 1,740,755 | 12/1929 | Wackerow . |
| 3,146,021 | 8/1964 | Erickson .......................... 296/106 |
| 3,387,406 | 6/1968 | Coker et al. ........................ 49/192 |
| 4,358,150 | 11/1982 | Nash ................................. 296/50 |
| 5,035,449 | 7/1991 | Shiratori et al. .................... 292/48 |
| 5,265,450 | 11/1993 | Doyle ............................ 296/57.1 X |

*Primary Examiner*—Joseph D. Pape
*Attorney, Agent, or Firm*—Christopher A. Taravella

[57] ABSTRACT

There is disclosed herein a tailgate handle assembly including a single actuator lever which is pivotable by a lift handle to pull a pair of rods laterally inwardly to release oppositely disposed tailgate latches. The initial installation steps are simplified with respect to connecting the pair of rods to the handle assembly.

11 Claims, 3 Drawing Sheets

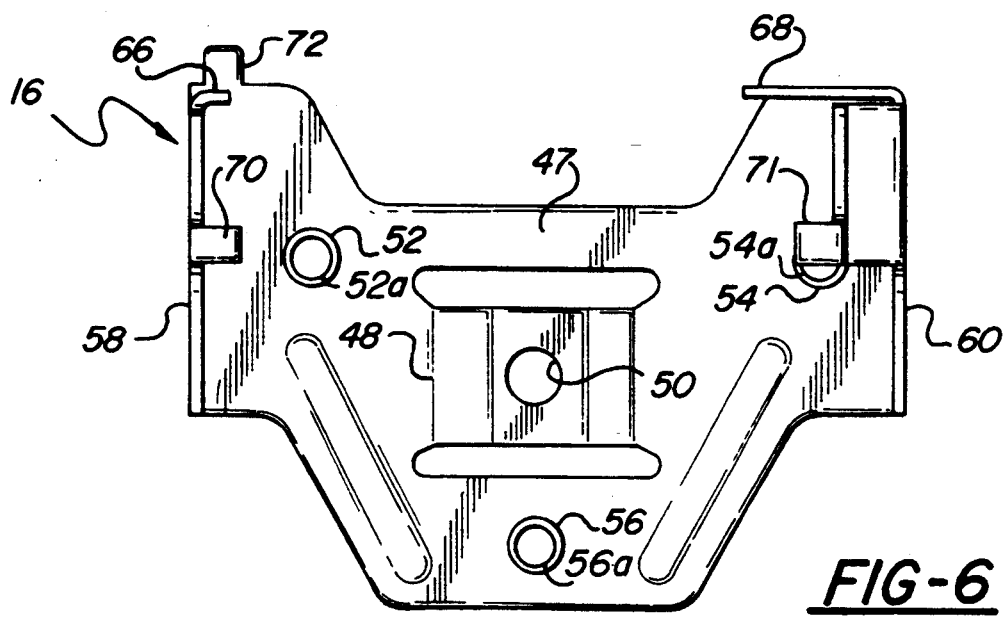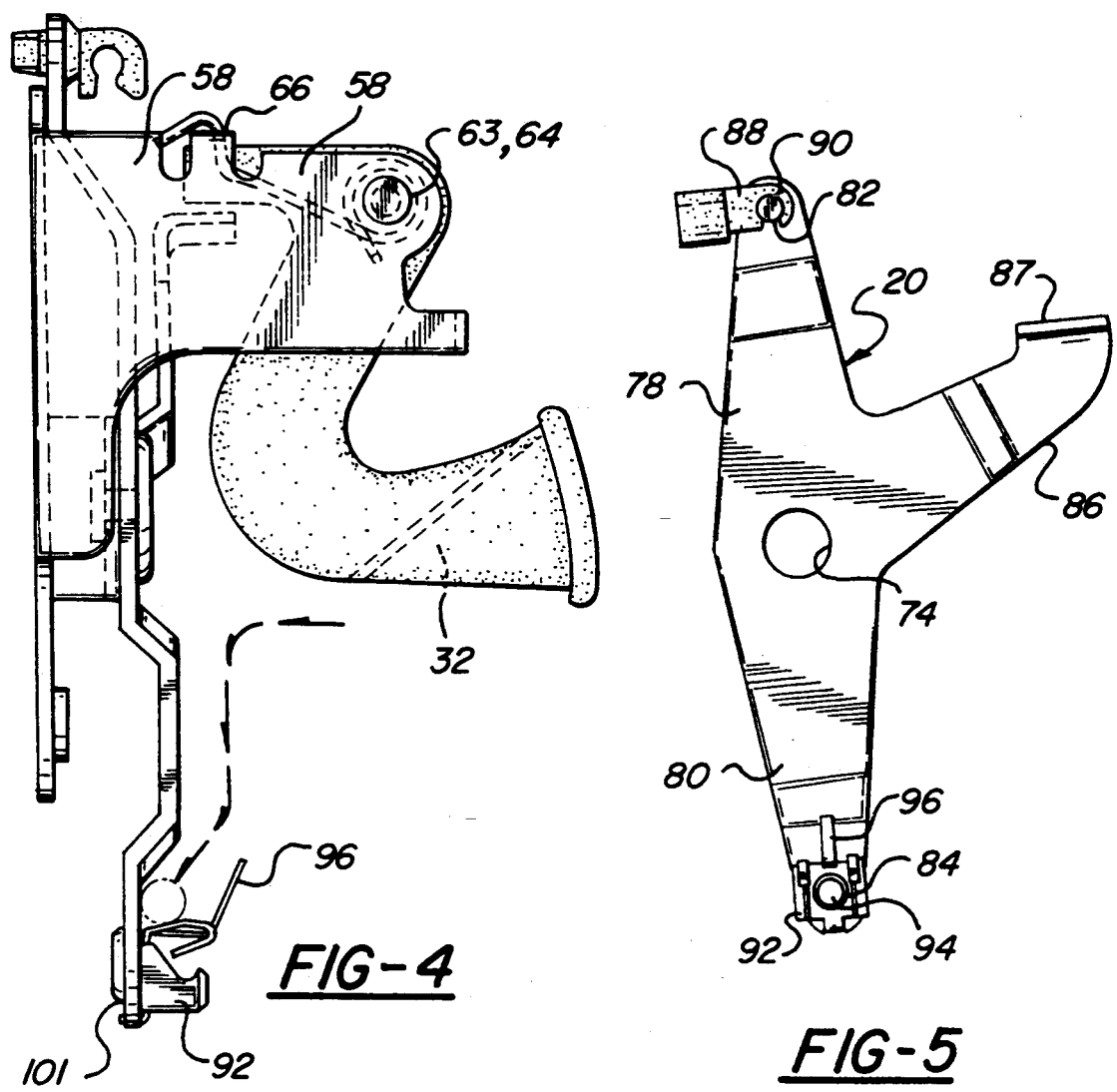

TAILGATE HANDLE ASSEMBLY AND METHOD OF ASSEMBLY THEREOF

TECHNICAL FIELD

This invention relates generally to tailgate latching arrangements and, more particularly, to a vehicle tailgate handle assembly therefor, and a method of assembly thereof into the tailgate.

BACKGROUND ART

Wackerow U.S. Pat. No. 1,740,755 tailgate latch structure discloses a pair of rods extending oppositely outwardly from a plate which is rotatable by lever to move out of engagement with side latches.

Ericson U.S. Pat. No. 3,146,021 tailgate closure latch discloses a lever pivotally mounted at an intermediate location thereon, with links extending rightwardly and leftwardly from the respective ends thereof to side latches. A handle, which can only be moved when the tailgate window is open, is rotated in one direction to rotate the lever and thereby pull both links inwardly to release the latches.

Coker et al U.S. Pat. No. 3,387,406 discloses a tailgate with a pivotable handle assembly mounted on the inside thereof. A link extends from the handle assembly to a first arm of a bell crank lever having a rod extending in one direction from one end thereof to one latch mechanism, with a second arm of the bell crank lever abutted against a pivoted member having a second rod extending therefrom in the opposite direction to a second latch mechanism.

Nash U.S. Pat. No. 4,358,150 discloses a tailgate handle assembly including an outwardly pivotable handle having oppositely extending rods connected thereto by respective bent inner end portions, with respective bent outer end portions adapted to release latch mechanisms in response to manual pivoting of the handle.

Shiratori et al U.S. Pat. No. 5,035,449 discloses a rear door lock device including a pivotable handle connected by a rod to a first pivotable lever which is adapted to engage a pin to pivot a second pivotable lever to, in turn, engage and pivot a projection of a third pivotable lever having rods extending leftwardly and rightwardly from opposite ends thereof to latch mechanisms at the respective sides of the door.

DISCLOSURE OF THE INVENTION

A general object of the invention is to provide a vehicle tailgate improved handle assembly which is simplified in construction, easily installed, light weight, rattle-free, and efficient in operation and assembly.

Another object of the invention is to provide a tailgate handle assembly including a single actuator lever pivotable by a lift handle to pull a pair of rods laterally inwardly to release oppositely disposed latches.

A further object of the invention is to provide a handle assembly for a vehicle tailgate, including a mounting bracket, a lift handle and a three-legged actuator lever pivotally mounted thereon, oppositely disposed rods connected between two of the legs of the actuator lever and two respective latches at the upper outer edges of the tailgate, and a spring operative between the handle and the bracket to urge the return of the lift handle to its stop position after pivotally pulling both rods inwardly from the latches.

Still another object of the invention is to provide an improved method of assembly of the tailgate handle assembly, eliminating the need for any fixture to assist in the assembly operation.

These and other objects and advantages will be more apparent when reference is made to the following drawings and the accompanying description.

BRIEF DESCRIPTION OF THE DRAWINGS

FIG. 4 is an end view taken along the plane of the line 4—4 of FIG. 2, and looking in the direction of the arrows;

FIG. 5 is a rear view of a portion of the FIG. 2 structure; and

FIG. 6 is a front view of a portion of the FIG. 2 structure.

BEST MODE OF CARRYING OUT THE INVENTION

Figure 1A:
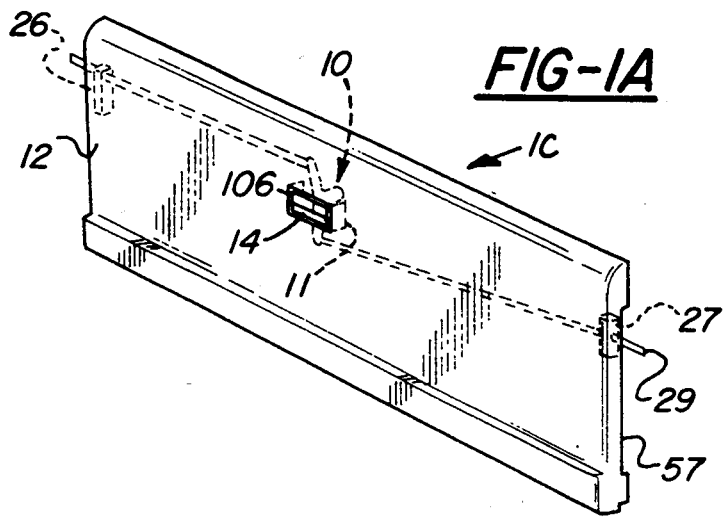
FIG. 1A is a perspective view of a vehicle tailgate embodying the invention.
Figure 1C:
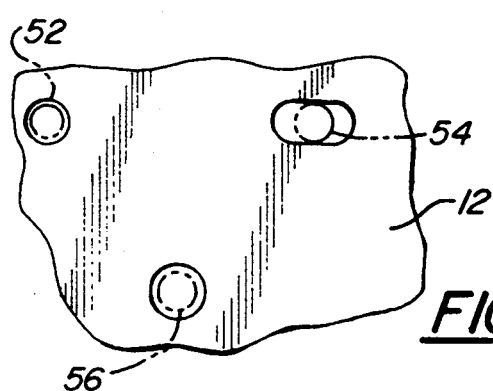
FIG. 1C is a fragmentary view of a portion of the tailgate.
Figure 1B:
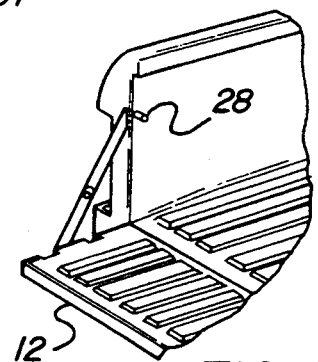
FIG. 1B is a fragmentary perspective view of the vehicle cargo area with the tailgate in its open position.
Figure 3:
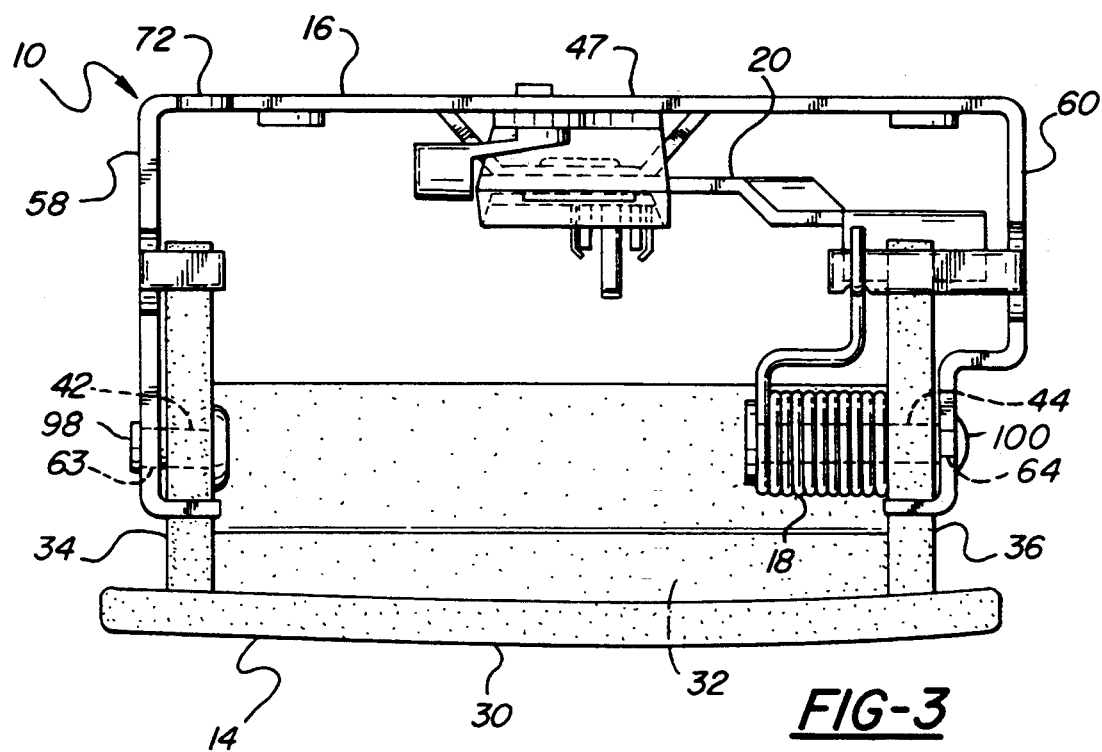
FIG. 3 is a plan view taken along the plane of the line 3—3 of FIG. 2, and looking in the direction of the arrows.
Figure 2:
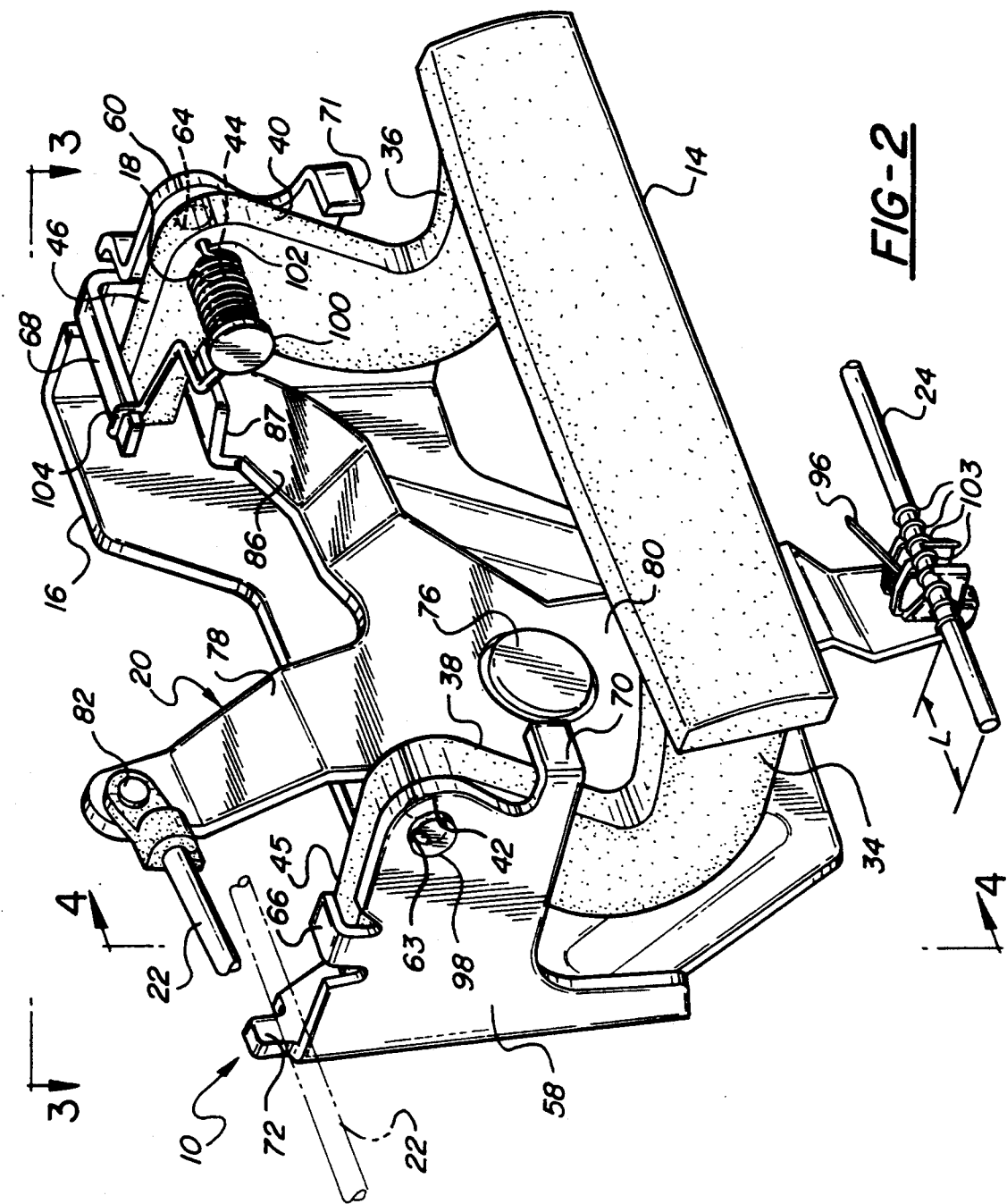
FIG. 2 is an enlarged perspective view of the inventive handle assembly.

Referring now to the drawings in greater detail, FIGS. 1A, 1B, and 2 illustrate, by way of example, a handle assembly 10 mounted in an opening 11 on a pickup truck tailgate 12. The assembly 10 includes generally a handle 14 pivotally mounted at opposite ends thereof to respective sides of a mounting bracket 16. A spring 18 connected between the handle 14 and the bracket 16 urges the handle into a closed position. A three-legged actuator lever 20 is pivotally mounted at its center on a center portion of the bracket 16, with oppositely disposed vertically oriented legs thereof adapted to being connected to respective rods 22 and 24 extending from respective conventional latches 26 and 27 located at opposite sides of the tailgate 12, in cooperation with strikers 28 and 29. The third leg extends toward one side of the bracket to be acted upon by the spring-loaded handle 14.

More specifically, the handle 14 includes a front plate 30 with an underlying pocket 32 and side walls 34 and 36. A pair of arms 38 and 40 extend upwardly from the respective side walls 34 and 36. A pair of aligned openings 42 and 44 are formed adjacent the ends of the respective arms 38 and 40. A pair of nose-like projections 45 and 46 extend forwardly from the ends of the arms 38 and 40, respectively.

The bracket 16 (FIG. 5) includes a front wall 47 with an inwardly recessed center segment 48 having an opening 50 formed therein. Three threaded holes 52, 54 and 56 are formed in the wall 47, suitable for receiving suitable fasteners 52a, 54a and 56a to secure the bracket 16 to the inner surface of the inner wall 57 of the tailgate 12. Oppositely disposed side walls 58 and 60 extend rearwardly from the sides of the front wall 47, with aligned openings 63 and 64 (FIG. 4) formed adjacent the upper end portions thereof. A first pair of laterally inwardly extending fingers 66 and 68 are formed on the upper edges of the respective side walls 58 and 60, and a second pair of laterally inwardly extending fingers 70 and 71 are formed on the lower end portions of the respective side walls 58 and 60. An upwardly extending rod support flange 72 is formed on the front wall 47 adjacent the finger 66.

The actuator lever 20 (FIG. 5) includes a center opening 74, with a suitable rivet 76 extended through the aligned openings 74 and 50, pivotally securing the lever 20 to the recessed center segment 48 on the inner or handle side thereof. The lever 20 includes oppositely disposed, upwardly and downwardly extending legs 78 and 80, having respective openings 82 and 84 formed through the distal end portions thereof. The third leg 86 extends rightwardly and upwardly from the center portion of the lever 20, and having a rearwardly extending lug 87 formed on the upper edge of the end thereof. A first rod clip 88 is pivotally connected on the end of the leg 78 through the opening 82. A second rod clip 92 is pivotally connected by a rivet 94 on the end of the leg 80 through the opening 84. A foam rubber washer 101 isolates the clip 90 from the pivot leg 80 (FIG. 4). An upwardly extending rod support finger 96 is formed on the outer edge of the clip 92.

A rivet 98 is mounted through the aligned openings 42 and 63 of the respective arm 38 and side wall 58, pivotally interconnecting the latter arm and side wall.

A rivet 100 is mounted through the aligned openings 44 and 64 of the respective arm 40 and side wall 60, pivotally interconnecting the latter arm and side wall. The spring 18 is a coil spring mounted around the rivet 100, with one extended end 102 thereof secured to the arm 40, and the other extended end 104 thereof abutted against the finger 68, so as to urge the arms 38 and 40 upwardly, away from the respective fingers 70 and 71, to cause the nose like extensions 45 and 46 to abut against the respective fingers 66 and 68.

The first rod 22 is secured at one end thereof to the upper leg 78 by the snap-in clip 88, and extended leftwardly to the latch 26. The second rod 24 is secured at one end thereof to the lower leg 80 by the clip 92, and extended rightwardly to the latch 28. In the tailgate closed position, the rod 22 holds the upper leg 78 to the left, and the rod 24 holds the lower leg 80 to the right, retaining the lug 87 of the side leg 86 against the end of the nose-like extension 46.

In operation, when it is desired to open the tailgate 12 by unlatching the latches 26 and 27, and pivoting the tailgate vertically downward, the operator's fingers are placed in the pocket 32 to pull the front plate 30 rearwardly, pivoting the arms 38 and 40 about the respective rivets 98 and 100, against the force of the spring 18, to thereby lower the nose-like projection 46 of the arm 40 against the lug 88. This action of the projection 46 against the lug 87 pivots the side leg 86, and, hence, the vertical legs 78 and 80 in a clockwise direction (FIG. 2) about the rivet 76, pulling the rods 22 and 24 rightwardly and leftwardly, respectively, to thereby unlatch each of the latches 26 and 28, to permit the tailgate 12 to be lowered. The inwardly extending fingers 70 and 71 serve as stops for the pivotal movement of the arms 38 and 40 of the handle 14.

For the assembly of the handle assembly 10 to the tailgate 12, the assembly 10 is first seated or hung on the edge of the opening 11 in the tailgate, resting on the bracket side walls 58 and 60. The rod 22 is extended through the left side of the tailgate 12 and rested on the edge of the side wall 58, retained by the rod support flange 72. The end portion of the rod 22 is then snapped into the clip 88. The assembly 10 is then extended completely into the opening 11 and secured to the inner tailgate wall 57 by the fasteners 52a and 54a in the threaded holes 52 and 54 at minimum for processing. The rod 24 is extended from the right side of the tailgate 12 to rest at its inner end portion on top of the clip 92, retained from falling off by the support finger 96. This eliminates the need for any fixture to be inserted through the opening, as has generally been the case heretofor. Once retained in this manner, with needle nosed pliers, the installer then moves the end portion over the finger 96 and snapped into the clip 92 at the required length. Rolled rings 103 formed on the lower rod 24 allow for build tolerance and provide simultaneous release of the left and right hand latches. Length "L" (FIG. 2) beyond the rings 103 is required for installation. The fastener 56a can now be secured in the hole 56. The upper rod 22 is now operative at its outer end with the latch 26 and striker 28. The lower rod 24 is now operative at its outer end with the latch 27 and striker 29. A suitable escutcheon 106 is then mounted on the edge of the opening 11 around the handle 14.

INDUSTRIAL APPLICABILITY

It should be apparent that the invention provides an improved tailgate handle assembly which is substantially rattle-free by virtue of including a single actuator lever for oppositely extending counterbalanced latch-actuating rods.

It should be further apparent that the invention provides a tailgate handle assembly which eliminates the need for any fixture to be used to assist in the initial assembly of the usual latch-actuating rods to the handle assembly within an opening in the tailgate.

While but one embodiment of the invention has been shown and described, other modifications thereof are possible within the scope of the following claims.

What is claimed is:

1. On a motor vehicle having a tailgate hinged for vertical downward pivotal movement, the tailgate having latches operatively connected adjacent the respective sides thereof, a handle assembly including bracket means secured to the tailgate, and handle means pivotally connected to the bracket, the improvement comprising spring means operatively connected between the handle means and the bracket means for urging a portion of said handle means into abutting relationship with a portion of said bracket means, and a single actuator lever adapted to being connected by a pair of rods to said latches and being abutted against said portion of said handle means for manual movement thereby.

2. The improvement described in claim 1, wherein said single actuator lever includes two legs pivotally connected to the respective pair of rods, and a third leg abutted against said portion of said handle means.

3. The handle assembly described in claim 1, wherein said handle means includes a front plate, a laterally extending finger-receiving pocket underlying said front plate, and extension means extending from said front plate.

4. The handle assembly described in claim 3, wherein said extension means includes a pair of side walls formed on the ends of said pocket, a pair of arms extending from said side walls, and a pair of nose-like projections formed on said pair of arms.

5. The handle assembly described in claim 4, wherein said bracket means includes a front wall secured to the tailgate, oppositely disposed side walls extending from said front wall, and inwardly extending fingers formed on said respective side walls.

6. The handle assembly described in claim 5, and pivotal means for pivotally mounting said pair of arms to said respective pair of side walls.

7. The handle assembly described in claim 6, wherein said pivotal means includes a rivet for one arm and side wall, and a rivet bolt for the other arm and side wall.

8. The handle assembly described in claim 7, wherein said spring means includes a coil spring mounted around said rivet and between one of said arms and one of said fingers for urging said nose-like projections into abutting relationships with said respective inwardly extending fingers.

9. The handle assembly described in claim 8, wherein said single actuator lever includes oppositely disposed upwardly and downwardly extending legs for connection by said pair of rods to said latches, and a sidewardly extending leg having a lug formed on the distal end thereof adapted to abut against one of said nose-like projections, to be pivoted by manual movement of said handle means against the force of said coil spring to thereby pull said pair of rods inwardly to unlatch said latches and lower said tailgate.

10. A method of assembly of a handle assembly including a first fixed support portion and a lever having first and second legs having first and second attachment means on the respective ends thereof and being pivotally mounted at an intermediate point, with a second support portion provided on the end of the second attachment means, to a vehicle tailgate having outer and inner walls with an intermediate space and an opening formed in the outer wall thereof, and operatively connecting the handle assembly to first and second latch means adjacent the left and right ends of the tailgate, said method comprising the steps of:

a. mounting the handle assembly on the edge of the opening;

b. inserting a first rod from one end of the tailgate into said intermediate space and onto said first fixed support portion;

c. fixedly connecting the inner end of said first rod to the attachment means on the end of said first leg;

d. securing the handle assembly to the inner wall of the tailgate;

e. inserting a second rod from the other end of the tailgate into said intermediate space and onto said second support portion;

f. connecting the inner end of said second rod to the attachment means on the end of said second leg at the length as required from said second latch means.

11. The method described in claim 10, and the additional step of mounting an escutcheon around the edge of said opening and around the handle assembly.

* * * * *